United States Patent Office 3,143,556
Patented Aug. 4, 1964

3,143,556
6-METHYL-6-HYDROXY STEROIDS AND PROCESSES FOR THE PRODUCTION THEREOF
J Allan Campbell and John C. Babcock, Kalamazoo, Mich., assignors to The Upjohn Company, Kalamazoo, Mich., a corporation of Delaware
No Drawing. Filed Oct. 5, 1960, Ser. No. 60,559
18 Claims. (Cl. 260—397.4)

This invention relates to certain novel 6-methyl-6-hydroxy steroids of the pregnane series and more particularly to 6β,17α-dihydroxy-6α-methyl-4-pregnene-3,20-dione, 6α,17α-dihydroxy-6β-methyl-4-pregnene-3,20-dione, the corresponding 1-dehydro compounds, the 17acylates thereof and processes for the production thereof.

The compounds and processes of this invention are illustratively represented by the following sequence of formulae:

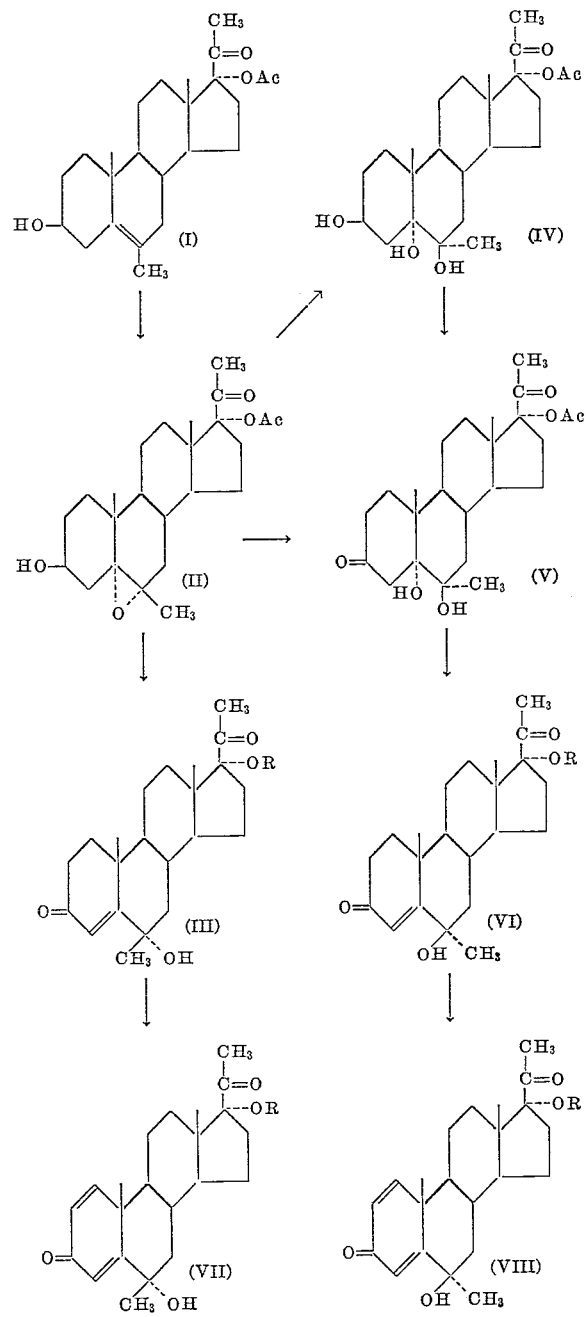

wherein Ac is the acylradical of an organic carboxylic acid, preferably a hydrocarbon carboxylic acid containing from 1 to 12 carbon atoms, inclusive, and R is selected from the group consisting of hydrogen and acyl in which the acyl radical is defined as above.

The novel compounds of this invention, represented by Formulae III, VI, VII and VIII have anti-inflammatory, progestational, central nervous system depressant, anti-fertility and salt and water regulating activities.

The novel compounds of this invention can be prepared and administered to birds and mammals, humans and animals, in a wide variety of oral or parenteral dosage forms singly, or in admixture with other coacting compounds. They can be associated with a pharmaceutical carrier which can be a solid material, e.g., starch, lactose, talc, calcium stearate, etc., or a liquid, e.g., water, ethanol, mixtures thereof, corn oil, etc., in which the compound is dissolved, dispersed or suspended. The solid compositions can take the form of tablets, powders, capsules, pills or the like, preferably in unit dosage forms for simple administration or precise dosages. The liquid compositions can take the form of solutions, emulsions, suspensions, syrups or elixirs. The novel compounds can also be administered topically in the form of ointments, creams, lotions, and the like, with or without coacting antibiotics, germicides or other materials forming advantageous compositions therewith.

The novel compounds of this invention are also useful as intermediates in the production of other useful compounds. The 17-acylates of Formulae III and VI, i.e., 6α,17α-dihydroxy-6β-methyl-4-pregnene - 3,20-dione 17-acylate and 6β,17α-dihydroxy-6α-methyl-4-pregnene-3,20-dione 17-acylate can be dehydrated with a dehydrating agent according to methods known in the art, for example, using thionyl chloride in the presence of pyridine; an N-haloamide or N-haloimide and sulfur dioxide in the presence of an organic base, e.g., pyridine; boiling glacial acetic acid; phosphorous trichloride or phosphorous pentachloride in the presence of pyridine, etc., to produce the corresponding 6-methyl-17α-hydroxy-4,6 - pregnadiene-3, 20-dione 17-acylate. The dehydration reaction is preferably carried out using thionyl chloride in the presence of pyridine at a temperature range from about —50° to about +50° C. Likewise the 17-acylates of Formulae VII and VIII, i.e., 6α,17α-dihydroxy-6β-methyl-1,4-pregnadiene-3,20-dione 17-acylate and 6β,17α-dihydroxy-6α-methyl-1,4-pregnadiene-3,20-dione 17-acylate, can be dehydrated by the above methods to give the corresponding 6-methyl-17α-hydroxy-1,4,6-pregnatriene-3,20 - dione 17-acylate.

The 6-methyl-17α-hydroxy-4,6-pregnadiene-3,20 - dione 17-acylate and 6-methyl-17α-hydroxy-1,4,6 - pregnatriene-3,20-dione 17-acylate thus obtained can be hydrolyzed by known methods, e.g., using dilute aqueous sodium or potassium hydroxide solution according to the procedure of U.S. Patent 2,916,486 to give 6-methyl-17α-hydroxy-4,6-pregnadiene-3,20-dione and 6-methyl-17α-hydroxy-1,4,6-pregnatriene-3,20-dione, respectively. These compounds and the 17-acylates thereof are highly active oral and parenteral progestational agents and are useful in the maintenance of pregnancy and the regulation of ovulation.

The process of this invention for the production of the 6α-hydroxy-6β-methyl compounds (III) comprises: epoxidizing 6-methyl-17α-acyloxypregnenolone (I) with a peracid to produce the corresponding 3β,17α-dihydroxy-5α, 6α-epoxy-6-methylpregnan-20-one 17-acylate (II); reacting the 5α,6α-epoxy compound thus obtained under Oppenauer oxidation conditions to give the corresponding 6α,17α-dihydroxy-6β-methyl - 4 - pregnene-3,20-dione 17-acylate (III) and hydrolyzing the 17-acylate thus obtained by known methods to produce 6α,17α-dihydroxy-6β-methyl-4-pregnene-3,20-dione (III).

The process of this invention for the production of the 6α-methyl-6β-hydroxy compounds (VI) comprises: oxidation of the selected 3β,17α-dihydroxy-5α,6α-epoxy-6-methylpregnan-20-one 17-acylate (II) to produce the corresponding 5α,6β,17α-trihydroxy-6α-methylpregnane-3,20-dione 17-acylate (V). Alternatively the compounds of Formula V can be produced by treating the selected 17-acylate of Formula II with a mineral acid to give the corresponding 3β,5α,6β,17α-tetrahydroxy-6α-methylpregnan-20-one 17-acylate (II) followed by oxidation to give the corresponding 5α,6β,17α-trihydroxy-6α-methylpregnane-3,20-dione 17-acylate (V). The compounds of Formula V are then treated with a dehydrating agent such as secondary amine or with a small amount of a strong acid or base to give the corresponding 6β,17α-dihydroxy-6α-methyl-4-pregnene-3,20-dione 17-acylate which can be hydrolyzed by known methods to give 6β,17α-dihydroxy-6α-methyl-4-pregnene-3,20-dione (VI).

The compounds of Formulae III and VI can be dehydrogenated at the 1,2-position by known fermentative or chemical dehydrogenation methods to give the corresponding 1-dehydro compounds of Formulae VII and VIII, respectively.

Starting materials for the process of this invention are 6-methyl-17α-acetoxypregnenolone and other 17-acylates thereof, prepared in accordance with Preparations 1–3.

According to the process of this invention the selected 6-methyl-17α-acyloxypregnenolone, for example, the 17-acetate, (I) is epoxidized with a peracid, e.g., peracetic or perbenzoic acid to produce the corresponding 3β,17α-dihydroxy-5α,6α-epoxy-6-methylpregnan-20-one 17-acylate (II).

The 6α,17α-dihydroxy-6β-methyl-4-pregnene-3,20-dione 17-acylates represented by Formula III are then prepared by subjecting the selected 17-acylate of Formula II in a suitable solvent such as benzene, toluene and the like, to Oppenauer oxidation conditions with a ketone, e.g., acetone, cyclohexanone, methyl ethyl ketone, etc., and an aluminum alkoxide, e.g., aluminum isoproproxide to give the corresponding 6α,17α-dihydroxy-6β-methyl-4-pregnene-3,20-dione 17-acylate (III).

The 6β,17α-dihydroxy-6α-methyl-4-pregnene-3,20-dione 17-acylates represented by Formula VI are prepared by oxidizing the selected 3β,17α-dihydroxy-5α,6α-epoxy-6-methylpregnan-20-one 17β-acylate (II) with a chromic acid oxidizing agent, e.g., sodium dichromate dihydrate in acetic acid, chromic anhydride or chromium trioxide and dilute sulfuric acid, etc., to give the corresponding 5α,6β,17α-trihydroxy-6α-methylpregnane-3,20-dione 17-acylate (V). Alternatively compounds of Formula V can be prepared by treating the selected 3β,17α-dihydroxy-5α,6α-epoxy-6-methylpregnan-20-one 17-acylate (II) in a suitable solvent such as dioxane with an aqueous mineral acid, e.g., perchloric, sulfuric, hydrochloric, etc., to obtain the corresponding 3β,5α,6β,17α-tetrahydroxy-6α-methylpregnan-20-one 17-acylate which on oxidation by known methods, e.g., a chromic acid oxidizing agent such as those previously listed, Oppenauer oxidation, N-bromoacetamide in the presence of pyridine, etc., gives the corresponding 5α,6β,17α-trihydroxy-6α-methylpregnane-3,20-dione 17-acylate (V). The selected 5α,6β,17α-trihydroxy-6α-methylpregnane-3,20-dione 17-acylate is then dehydrated with a dehydrating agent, i.e., a secondary amine, e.g., pyrrolidine, piperidine, morpholine, etc., (pyrrolidine is preferred) or with dilute base such as sodium hydroxide or a dilute acid such as hydrochloric acid, to give the corresponding 6β,17α-dihydroxy-6α-methyl-4-pregnene-3,20-dione 17-acylate (VI).

The compounds of Formulae III and VI, i.e., 6α,17α-dihydroxy-6β-methyl-4-pregnene-3,20-dione 17-acylate, 6β,17α-dihydroxy-6α-methyl-4-pregnene-3,20-dione 17-acylate and the corresponding free 17-alcohols are dehydrogenated at the 1,2-position by fermentative or chemical dehydrogenation to give the corresponding 1-dehydro compounds of Formulae VII and VIII, respectively. Fermentative dehydrogenation comprises the use of organisms such as Steptomyxa, Corynebacterium, Didymella, Calonectria, Alternaria, Colletotrichum, Cylindrocarpon, Ophiobolus, Fusarium, Listeria, Erysipelothrix, Mycobacterium, Trichothecium, Leptosphaeria, Curcurbitaria, Nocardia, enzymes of fungi of the family Tuberculariaceae and the like, under fermentation conditions well known in the art (e.g., U.S. Patents 2,602,769, 2,902,-410 or 2,902,411). Where Septomyxa is used to effect the 1-dehydrogenation it is found to be advantageous to use with the substrate and medium a steroid promoter, such as progesterone, 3-ketobisnor-4-cholen-22-al, 3-ketobisnorcholenic acid, 11β,21-dihydroxy-1,4,17(20)-pregnatrien-3-one, and the like. Chemical 1-dehydrogenation can be carried out with selenium dioxide according to procedures well known in the art [e.g., Meystre et al., Helv. Chim. Acta, 30, 734 (1956)].

The 17-acylates of Formulae III, VI, VII and VIII can be hydrolyzed by known methods, e.g., using dilute aqueous sodium or potassium hydroxide solution according to the procedure of U.S. Patent 2,916,486 to give the corresponding 17-free alcohols, i.e., 6α,17α-dihydroxy-6β-methyl-4-pregnene-3,20-dione, 6β,17α-dihydroxy-6α-methyl-4-pregnene-3,20-dione, 6α,17α-dihydroxy-6β-methyl-1,4-pregnadiene-3,20-dione and 6β,17α-dihydroxy-6α-methyl-1,4-pregnadiene-3,20-dione, respectively.

The following preparations and examples are illustrative of the products and process of this invention.

PREPARATION 1

6-Methyl-17α-Hydroxypregnenolone

A solution of 1.0 g. of 6-methyl-17α-acetoxypregnenolone in 20 ml. of 95% ethanol and 2.5 ml. of water containing 1.0 g. of potassium hydroxide is allowed to stand at room temperature (approximately 25° C.). Thereafter the mixture is neutralized by the addition of sufficient acetic acid and poured into 50 ml. of ice water. The ice water mixture is extracted with three 10 ml. portions of methylene chloride. The methylene chloride solutions are combined, washed with water, dried over anhydrous sodium sulfate and evaporated. The thus obtained residue is recrystallized three times from methanol to give 6-methyl-17-hydroxypregnenolone, a light colored crystalline solid.

PREPARATION 2

6-Methyl-17α-Hydroxypregnenolone 3,17-Dipropionate

A mixture of 1.0 g. of 6-methyl-17α-hydroxypregnenolone, 5 ml. of distilled propionic anhydride, 500 mg. of p-toluenesulfonic acid and 5 ml. of propionic acid is heated at 75° C. under a stream of nitrogen for a few minutes. The heat is then removed and the mixture is stirred for about 30 minutes. The mixture is then poured with vigorous stirring into 500 ml. of water. The precipitated solid is separated by filtration and dried to give 6-methyl-17α-hydroxypregnenolone 3,17-dipropionate, a light colored crystalline solid, which can be further purified by recrystallization from an organic solvent such as acetone: Skellysolve B hexanes, ethyl acetate, methanol and the like.

In the same manner substituting another hydrocarbon carboxylic acid anhydride for propionic anhydride together with the corresponding hydrocarbon carboxylic acid in place of propionic acid, for example, the anhydride of an aliphatic acid, e.g., acetic, propionic, butyric, valeric, hexanoic, lauric, trimethylacetic, isobutyric, isovaleric, tertiary butylacetic or formic acid (in the presence of acetic anhydride), a cycloaliphatic acid, e.g., β-cyclopentylpropionic, cyclohexane-carboxylic, cyclohexylacetic, an alkaryl acid, e.g., benzoic, phenylacetic, β-phenylpropionic, o-, m-, p-toluic, a saturated dibasic acid (which can be converted by known methods into water soluble, e.g., sodium, salts), e.g., succinic, adipic, a monobasic unsaturated acid, e.g., acrylic, crotonic, undecylenic, propiolic, 2-butynoic, undecolic, cinnamic, dibasic unsaturated acids (which can be converted by known methods into water soluble, e.g., sodium, salts), e.g., maleic and citraconic, and the like, is productive of the corresponding 3,17-diacylate.

PREPARATION 3

*6-Methyl-17α-Propionyloxypregnenolone*

A solution of 1.2 g. of 6-methylpregnenolone 3,17-dipropionate, 50 ml. of methanol and 0.5 ml. of concentrated hydrochloric acid is refluxed for about 1 hour. About half of the methanol is then evaporated under a stream of nitrogen and the product is flooded out with water, collected, dried and crystallized from acetone to give 6-methyl-17α-propionyloxypregnenolone, a light colored crystalline solid.

In the same manner as in the foregoing example, reacting other 6-methyl-17α-hydroxypregnenolone 3,17-diacylates dissolved in an alcohol with a strong mineral acid (e.g., concentrated hydrochloric) is productive of the corresponding 6-methyl - 17α - acyloxypregnenolone wherein the acyl radical is that of an acid listed in Preparation 2, above.

EXAMPLE 1

*3β,17α-Dihydroxy-5α,6α-Epoxy-6β-Methylpregnan-20-One 17-Acetate (II)*

To a slurry of 10 g. of 6-methyl-17α-acetoxypregnenolone (3β,17α-dihydroxy-6-methyl-5-pregnen-20-one 17-acetate) (I) and 1.0 g. of sodium acetate in 200 ml. of benzene was added 10 ml. of 40% peracetic acid solution with stirring and cooling in an ice bath. The cooling bath was then removed, and the reaction mixture was stirred until the reaction was complete. Water was then added, and the benzene was evaporated by passing a stream of nitrogen over the reaction mixture until about 40 ml. of benzene remained. The precipitate thus obtained was collected on a filter, washed with water and dried to give 9.7 g. of crude 3β,17α-dihydroxy-5α,6α-epoxy 6-methylpregnan-20-one 17-acetate. Recrystallization from acetone gave 7.4 g. of 3β,17α-dihydroxy-5α,6α-epoxy-6β-methylpregnan-20-one 17-acetate melting at 213–217° C. Two additional recrystallizations from acetone gave 3β,17α-dihydroxy-5α,6α-epoxy-6β-methylpregnan-20-one 17-acetate (II) melting at 226–229° C., $[\alpha]_D$ —49° in chloroform.

*Analysis.*—Calcd. for $C_{24}H_{36}O_5$: C, 71.25; H, 8.97. Found: C, 71.36; H, 9.08.

EXAMPLE 2

*6α,17α-Dihydroxy-6β-Methyl-4-Pregnene-3,20-Dione 17-Acetate (III)*

To a mixture of 2.0 g. of 3β,17α-dihydroxy-5α,6α-epoxy-6β-methylpregnan-20-one 17-acetate (II), 50 ml. of toluene and 20 ml. of cyclohexanone dried by refluxing through a water trap under an atmosphere of nitrogen was added 2.0 g. of aluminum isopropoxide. The reaction mixture was refluxed for a period of about 30 minutes, cooled, poured into a 1 N solution of hydrochloric acid saturated with sodium chloride and purged well with nitrogen. The organic phase was separated from the aqueous phase, washed once with 1 N hydrochloric acid saturated with sodium chloride and twice with brine. Each aqueous wash was back extracted with the same portion of toluene. The toluene solutions were combined, dried over magnesium sulfate and filtered. The filtrate was then evaporated at reduced pressure to remove the toluene. The residue was diluted with Skellysolve B hexanes and the precipitated product thus obtained was collected on a filter, washed with Skellysolve B hexanes and dried to give 1.8 g. of 6α,17α-dihydroxy-6β-methyl-4-pregnene-3,20-dione 17-acetate melting at 233–239° C. which was recrystallized from acetone to give 1.4 g. of product melting at 238–243.5° C. Another recrystallization from acetone gave 6α,17α-dihydroxy-6β-methyl-4-pregnene-3,20-dione (III) melting at 240–244° C.; $[\alpha]_D$ +37° (chloroform);

$$\lambda^{Alc.}_{max.} \ 243 \ m\mu, \ \epsilon = 14,900.$$

*Analysis.*—Calcd. for $C_{24}H_{34}O_5$: C, 71.61; H, 8.51. Found: C, 71.74; H, 9.02.

In the same manner following the procedures of Examples 1 and 2 but substituting in Example 1 other 17-acylates of 6-methyl-17α-hydroxypregnenolone (I) prepared in Preparation 3, above, e.g., 6-methyl-17α-propionoxypregnenolone, 6-methyl - 17α - hexanoyloxypregnenolone, 6-methyl-17α-(β-cyclopentylpropionoxy)-pregnenolone, 6-methyl-17α-phenylacetoxypregnenolone, 6-methyl-17α-hemisuccinoyloxypregnenolone, and the like, in place of 6-methyl-17α-acetoxypregnenolone is productive of the corresponding 6α,17α-dihydroxy-6β-methyl-4-pregnene-3,20-dione 17-acylate wherein the acyl radical corresponds to that of the selected starting material, e.g., 6α,17α-dihydroxy-6β-methyl-4-pregnene-3,20-dione 17 - propionate, 6α,17α-dihydroxy-6β-methyl-4-pregnene - 3,20 - dione 17-hexanoate, 6α,17α-dihydroxy-6β-methyl-4-pregnene-3,20-dione 17-(β-cyclopentylpropionate), 6α,17α-dihydroxy-6β-methyl-4-pregnene-3,20-dione 17-phenylacetate, 6α,17α-dihydroxy-6β-methyl-4-pregnene-3,20-dione 17 - hemisuccinate and the like.

EXAMPLE 3

*6α,17α-Dihydroxy-6β-Methyl-4-Pregnene-3,20-Dione (III)*

A mixture of 200 mg. of 6α,17α-dihydroxy-6β-methyl-4-pregnene-3,20-dione 17-acetate in 4 ml. of 95% ethanol and 0.5 ml. of water containing 100 mg. of potassium hydroxide is allowed to stand at room temperature (approximately 25° C.) until the reaction is complete. Thereafter the mixture is neutralized by the addition of sufficient dilute aqueous acetic acid and poured into 50 ml. of ice water. The ice water solution is extracted with three 10 ml. of portions of methylene chloride. The methylene chloride solutions are combined, washed with water, dried over anhydrous sodium sulfate and evaporated. The thus obtained residue is recrystallized three times from acetone-Skellysolve B hexanes to give 6α,17α-dihydroxy-6β-methyl - 4 - pregnene - 3,20 - dione, a light colored crystalline solid.

In the same manner as shown in Example 3 other 6α, 17α-dihydroxy-6β-methyl-4-pregnene-3,20-dione 17 - acylates can be hydrolyzed at room temperature with a base such as aqueous sodium or potassium hydroxide, aqueous sodium or potassium carbonate and the like to give 6α, 17α-dihydroxy-6β-methyl-4-pregnene-3,20-dione (III).

EXAMPLE 4

*3β,5α,6β,17α-Tetrahydroxy-6α-Methylpregnan-20-One 17-Acetate (IV)*

A mixture of 1.0 g. of 3β,17α-dihydroxy-5α,6α-epoxy-6β-methylpregnan-20-one 17-acetate (II), 5 ml. of dioxane, 2 ml. of water and 2 drops of 70% perchloric acid was warmed to 60° C. for about 1.5 hours. The product was precipitated by the addition of water to the reaction mixture, collected on a filter, and recrystallized from acetone-Skellysolve B hexanes and then from aqueous methanol to give 3β,5α,6β,17α-tetrahydroxy-6α-methylpregnan-20-one 17-acetate (IV) melting at 216–228° C., $[\alpha]_D$ —24 (ethanol).

*Analysis.*—Calcd. for $C_{24}H_{28}O_6$: C, 68.22; H, 9.0. Found: C, 67.85; H, 8.94.

EXAMPLE 5

*5α,6β,17α-Trihydroxy-6α-Methylpregnane-3,20-Dione 17-Acetate (V)*

To a solution of 0.3 g. of sodium dichromate dihydrate in 3 ml. of acetic acid was added 250 mg. of 3β,5α,6β,17α-tetrahydroxy-6α-methylpregnan-20-one 17-acetate (IV). The reaction mixture was allowed to stand about 18 hours at room temperature and then 1 ml. of methanol and water was added. The precipitate thus obtained, was collected on a filter, washed with water, dried and recrystallized from acetone-Skellysolve B hexanes to give 5α,6β,17α-trihydroxy-6α-methylpregnane-3,20-dione 17-acetate (V) melting at 253–255° C., which was shown by infrared analysis to be identical to the 5α,6β,17α-trihydroxy-6α-methylpregnane-3,20-dione 17-acetate prepared in Example 6.

EXAMPLE 6

5α,6β,17α-Trihydroxy-6α-Methylpregnane-3,20-Dione 17-Acetate (V)

To a cold solution of 1.0 g. of sodium dichromate dihydrate in 7 ml. of acetic acid was added 1.0 g. of 3β,17α-dihydroxy-5α,6α-epoxy-6β-methylpregnan-20-one 17 - acetate (II). The mixture was kept at about 5° C. for a period of about 18 hours and then poured into water. An orange colored precipitate formed first which as removed by filtration; the filtrate gave 0.4 g. of 5α,6β,17α-trihydroxy-6α-methylpregnane-3,20-dione 17-acetate as white crystals melting at 245–250° C., which when recrystallized twice from acetone-Skellysolve B hexanes gave 5α,6β,17α-trihydroxy-6α-methylpregnane-3,20 - dione 17-acetate (V) melting at 252–255° C., $[\alpha]_D$ —9° in chloroform.

Analysis.—Calcd. for $C_{24}H_{36}O_6$: C, 68.54; H, 8.62. Found: C, 69.00; H, 9.03.

EXAMPLE 7

6β,17α-Dihydroxy-6α-Methyl-4-Pregnene-3,20-Dione 17-Acetate (VI)

To a solution of 0.2 g. of 5α,6β,17α-trihydroxy-6α-methylpregnane-3,20-dione 17-acetate (V) in a small amount of boiling methanol was added 0.2 ml. of pyrrolidine under nitrogen. The solution was then concentrated under a stream of nitrogen. The product was precipitated with a small amount of water, collected, washed with dilute hydrochloric acid and water and dried to give 6β,17α-dihydroxy-6α-methyl-4-pregnene - 3,20 - dione 17-acetate melting at 213–221° C., which was recrystallized from acetone-Skellysolve B hexanes to yield 100 mg. of 6β,17α-dihydroxy-6α-methyl-4-pregnene - 3,20 - dione 17-acetate melting at 221–224° C. Another recrystallization from acetone-Skellysolve B hexanes gave 6β,17α-dihydroxy-6α-methyl-4-pregnene-3,20-dione 17-acetate (VI) melting at 205–207.5° C.; $[\alpha]_D$+1 (chloroform);

$$\lambda^{alc.}_{max.} \ 238 \ m\mu, \ \epsilon = 13,700.$$

(The melt was cooled and rubbed. It remelted at 224–224.5° C.)

Analysis.—Calcd. for $C_{24}H_{34}O_5$: C, 71.61; H, 8.51. Found: C, 71.83; H, 8.67.

In the same manner substituting in Example 1 other 17-acylates of 6-methyl-17α-hydroxypregnenolone (I) in which acyl is the acyl radical of a hydrocarbon carboxylic acid, e.g., those acids listed in Preparation 1, above, e.g., 6-methyl-17α-propionoxypregnenolone, 6-methyl-17α-hexanoyloxypregnenolone, 6-methyl-17α-(β-cyclopentylpropionoxy)-pregnenolone, 6-methyl-17α-phenylacetoxypregnenolone and 6-methyl-17α-hemisuccinoyloxypregnenolone, in place of 6-methyl-17α-acetoxypregnenolone and following the procedures of Examples 1 and 2, 6 and 7 or alternatively, the procedures of Examples 1, 2, 4, 5 and 7, there is thus produced as the product of each example the selected 17-acylate corresponding otherwise to the 17-acetate, thereby giving ultimately the product of Example 7, the corresponding 6β,17α-dihydroxy-6α-methyl-4-pregnene-3,20-dione 17-acylate (VI) wherein the acyl radical corresponds to the selected starting material, e.g., 6β, 17α - dihydroxy - 6α - methyl - 4 - pregnene - 3,20 - dione 17-propionate, 6β,17α-dihydroxy-6α-methyl-4-pregnene-3, 20-dione 17-hexanoate, 6β,17α-dihydroxy-6α-methyl-4-pregnene-3,20-dione 17-(β-cyclopentylpropionate), 6β, 17α - dihydroxy - 6α - methyl - 4 - pregnene - 3,20 - dione 17-phenylacetate, 6β,17α-dihydroxy-6α-methyl-4-pregnene-3,20-dione 17-hemisuccinate and the like.

EXAMPLE 8

6β,17α-Dihydroxy-6α-Methyl-4-Pregnene-3,20-Dione (VI)

A solution of 200 mg. of 6β,17α-dihydroxy-6α-methyl-4-pregnene-3,20-dione 17-acetate (VI) in 4 ml of 95% ethanol and 0.5 ml. of water containing 100 mg. of potassium hydroxide is allowed to stand at room temperature (approximately 25° C.) until reaction is complete. Thereafter the mixture is neutralized by the addition of sufficient acetic acid and poured into 50 ml. of ice water. The ice water solution is extracted with three 10 ml. portions of methylene chloride. The methylene chloride solutions are combined, washed with water, dried over anhydrous sodium sulfate and evaporated. The thus obtained residue is recrystallized three times from methanol to give 6β,17α-dihydroxy-6α-methyl-4-pregnene-3,20-dione (VI), a light colored crystalline solid.

In the same manner as shown in Example 3 other 6β, 17α - dihydroxy - 6α - methyl - 4 - pregnene - 3,20 - dione 17-acylates can be hydrolyzed at room temperature with a base such as sodium or potassium hydroxide, sodium or potassium carbonate or the like to give 6β,17α-dihydroxy-6α-methyl-4-pregnene-3,20-dione (VI).

EXAMPLE 9

6α,17α-Dihydroxy-6β-Methyl-1,4-Pregnadiene 3,20-Dione 17-Acetate (VII)

A mixture of 100 mg. of 6α,17α-dihydroxy-6β-methyl-4-pregnene-3,20-dione 17-acetate (III) in 6 ml. of tertiary butyl alcohol and 0.55 ml. of acetic acid is heated together with 30 mg. of selenium dioxide to approximately 75° C. under stirring for a period of about 24 hours. Thereafter another 30 mg. portion of selenium dioxide is added and the mixture heated to 75° C. under continuous stirring for an additional period of 24 hours. The mixture is then cooled, filtered to remove the selenium dioxide and evaporated. The residue is chromatographed through a column of anhydrous magnesium silicate (Florisil) and recrystallized from acetone-Skellysolve B hexanes to give 6α,17α-dihydroxy-6β-methyl-1,4-pregnadiene-3,20-dione 17-acetate (VII), a light colored crystalline solid.

In the same manner substituting 6β,17α-dihydroxy-6α-methyl-4-pregnene-3,20-dione 17-acetate (VI) for 6α,17α-dihydroxy-6β-methyl-4-pregnene-3,20-dione 17-acetate in Example 9 is productive of 6β,17α-dihydroxy-6α-methyl-1,4-pregnadiene-3,20-dione 17-acetate.

In the same manner other 6α,17α-dihydroxy-6β-methyl-4-pregnene-3,20-dione 17-acylates (III) and 6β,17α-dihydroxy-6α-methyl-4-pregnene-3,20-dione 17-acylates (VI), e.g., the compounds prepared in the second paragraph of Examples 2 and 7, above, can be substituted as the starting steroid in Example 9 to produce the corresponding 6α, 17α - dihydroxy - 6β - methyl - 1,4 - pregnadiene - 3,20-dione 17-acylate and the corresponding 6β,17α-dihydroxy-6α-methyl-1,4-pregnadiene-3,20-dione 17-acylate, respectively. The following are typical of the compounds thus produced: 6α,17α - dihydroxy-6β-methyl-1,4-pregnadiene-3,20-dione 17-propionate, 6α,17α-dihydroxy-6β-methyl-1, 4-pregnadiene-3,20-dione 17-hexanoate, 6α,17α-dihydroxy-6β-methyl-1,4-pregnadiene-3,20-dione 17-(β-cyclopentylpropionate), 6α,17α-dihydroxy-6β-methyl-1,4-pregnadiene-3,20-dione 17-phenylacetate, 6α,17α-dihydroxy-6β-methyl-1,4-pregnadiene-3,20-dione 17-hemisuccinate, the corresponding 6β-hydroxy-6α-methyl compounds (VIII) and the like.

EXAMPLE 10

6β,17α-Dihydroxy-6α-Methyl-1,4-Pregnadiene-3,20-Dione 17-Acetate (VIII)

Five 100-ml. portions of a medium, in 250-ml. Erlenmeyer flasks, containing 1% glucose, 2% corn steep liquor (60% solids) and tap water, are adjusted to a pH of 4.9. This medium is sterilized for 45 minutes at 15 p.s.i. pressure and inoculated with a one to two day vegetative growth of Septomyxa affinis A.T.C.C. 6737. The Erlenmeyer flasks are shaken at room temperature (about 26° to 28° C.) for a period of about 3 days. At the end of this period this 500-ml. volume is used as an inoculum for 10 liters of the same glucose-corn steep liquor medium which in addition contains 5 ml. of an antifoam compound (a mixture of lard oil and octadecanol). The fermentor is placed into the water-bath, adjusted to 28° C. and the contents stirred thoroughly (300 r.p.m.) and aerated (0.1 liter of air per minute to 10 liters of beer). After 20 hours of incubation, when a good growth has been developed, 1 g. of 6β,17α-dihydroxy-6α-methyl-4-pregnene-3,20-dione 17-acetate (VI) plus 50 mg. of 3-ketobisnor-4-cholen-22-al dissolved in 16 ml. of dimethylformamide is added and the incubation carried out at the same temperature (28° C.) and aeration for a period of 48 hours (final pH 8.3). The mycelium is then filtered off and extracted with three 200-ml. portions of acetone. The beer is extracted with three 1-liter portions of methylene chloride and thereupon the acetone and the extracts of the beer are combined, dried over anhydrous sodium sulfate and evaporated and the resulting residue chromatographed over an anhydrous magnesium silicate column. The residue is eluted with Skellysolve B hexanes containing increasing proportions of acetone and is crystallized to give 6β,17α-dihydroxy-6α-methyl-1,4-pregnadiene-3,20-dione 17-acetate (VIII), a light colored crystalline solid.

In the same manner substituting 6α,17α-dihydroxy-6β-methyl-4-pregnene-3,20,dione 17-acetate for 6β,17α-dihydroxy-6α-methyl-4-pregnene-3,20-dione 17-acetate in Example 10 is productive of 6α,17α-dihydroxy-6β-methyl-1,4-pregnadiene-3,20-dione 17-acetate.

In the same manner other 6β,17α-dihydroxy-6α-methyl-4-pregnene-3,20-dione 17-acylates and 6α,17α-dihydroxy-6β-methyl-4-pregnene-3,20-dione 17-acylates, e.g., the compounds prepared in Examples 7 and 2, respectively, can be substituted as the starting steroid in Example 10 to produce the corresponding 6β,17α-dihydroxy-6α-methyl-1,4-pregnadiene-3,20-dione 17-acylate (VIII) and the corresponding 6α,17α-dihydroxy-6β-methyl-1,4-pregnadiene-3,20-dione 17-acylate (VII), respectively. The following are typical of the compounds thus produced: 6β,17α-dihydroxy-6α-methyl-1,4-pregnadient-3,20-dione 17-propionate, 6β,17α-dihydroxy-6α-methyl-1,4-pregnadiene-3,20-dione 17-hexanoate, 6β,17α-dihydroxy-6α-methyl-1,4-pregnadiene-3,20-dione 17-(β-cylopentylpropionate), 6β,17α-dihydroxy-6α-methyl-1,4-pregnadiene-3,20-dione 17-phenylacetate, 6β,17α-dihydroxy-6α-methyl-1,4-pregnadiene-3,20-dione 17-hemisuccinate, the corresponding 6α-hydroxy-6β-methyl compounds (VII) and the like.

Similarly substituting the corresponding 17-free alcohols, e.g., 6β,17α-dihydroxy-6α-methyl-4-pregnene-3,20-dione (VI) or 6α,17α-dihydroxy-6β-methyl-4-pregnene-3,20-dione (III), as the starting steroid in Example 10 is productive of the corresponding $\Delta^{1,4}$-compound, i.e., 6β,17α - dihydroxy - 6α - methyl - 1,4 - pregnadiene - 3,20-dione (VIII) and 6α,17α-dihydroxy-6β-methyl-1,4-pregnadiene-3,20-dione (VII) respectively.

EXAMPLE 11

*6α,17α-Dihydroxy-6β-Methyl-1,4-Pregnadiene-3,20-Dione (VII)*

A solution of 200 mg. of 6α,17α-dihydroxy-6β-methyl-1,4-pregnadiene-3,20-dione 17-acetate (VII) in 4 ml. of 95% ethanol and 0.5 ml. of water containing 100 mg. of potassium hydroxide is allowed to stand at room temperature (approximately 25° C.). Thereafter the mixture is neutralized by the addition of sufficient acetic acid and poured into 50 ml. of ice water. The ice water solution is extracted with three 10-ml. portions of methylene chloride. The methylene chloride solutions are combined, washed with water, dried over anhydrous sodium sulfate and evaporated. The thus obtained residue is recrystallized three times from methanol to give 6α,17α-dihydroxy-6β-methyl-1,4-pregnadiene-3,20-dione (VIII), a light colored crystalline solid.

EXAMPLE 12

*6β,17α-Dihydroxy-6α-Methyl-1,4-Pregnadiene-3,20-Dione (VIII)*

Substituting 6β,17α-dihydroxy-6α-methyl-1,4-pregnadiene-3,20-dione 17-acetate (VIII) for 6α,17α-dihydroxy-6β-methyl-1,4-pregnadiene-3,20-dione 17-acetate in Example 11 is productive of 6β,17α-dihydroxy-6α-methyl-1,4-pregnadiene-3,20-dione (VIII), a light colored crystalline solid.

In the same manner as shown in Example 12, other 6α,17α-dihydroxy-6β-methyl-4-pregnene-3,20-dione 17-acylates (VII) and 6β,17α-dihydroxy-6α-methyl-1,4-pregnadiene-3,20-dione 17-acylates (VIII) can be hydrolyzed at room temperature with a base such as sodium or potassium hydroxide, sodium or potassium carbonate or the like to give 6α,17α-dihydroxy-6β-methyl-4-pregnene-3,20-dione (VIII) and 6β,17α-dihydroxy-6α-methyl-1,4-pregnadiene-3,20-dione (VIII), respectively.

EXAMPLE 13

*6-Methyl-17α-Hydroxy-4,6-Pregnadiene-3,20-Dione 17-Acetate*

To a solution of 82 mg. of 6β,17α-dihydroxy-6α-methyl-4-pregnene-3,20-dione 17-acetate (VI) in 0.5 ml. of pyridine was added 0.03 ml. of thionyl chloride with cooling in an ice-bath. After a period of about 13 minutes the reaction mixture was poured into water. The precipitate thus obtained was collected on a filter, washed with water, dilute hydrochloric acid and again with water and dried to give 42 mg. of 6-methyl-17α-hydroxy-4,6-pregnadiene-3,20-dione 17-acetate. The product was recrystallized from ethyl acetate to give 6-methyl-17α-hydroxy-4,6-pregnadiene-3,20-dione 17-acetate melting at 211–215° C. The infrared spectrum confirmed the structure.

In the same manner substituting the 6β-methyl epimer, 6α,17α-dihydroxy-6α-methyl - 4 - pregnene-3,20-dione 17-acetate (III) as the starting material in Example 13 is likewise productive of 6-methyl-17α-hydroxy-4,6-pregnadiene-3,20-dione 17-acetate.

Similarly substituting as the starting steroid in Example 13 other 17-acylates of 6β,17α-dihydroxy-6α-methyl-4-pregnene-3,20-dione (III) or 6α,17α-dihydroxy-6β-methyl-4-pregnene-3,20-dione (VI) wherein the acyl radical is that of a hydrocarbon carboxylic acid, e.g., those acids listed in Preparation 2, above, is productive of the corresponding 6-methyl-17α-hydroxy-4,6-pregnadiene-3,20-dione 17-acylate.

EXAMPLE 14

*6-Methyl-17α-Hydroxy-1,4,6-Pregnatriene-3,20-Dione 17-acetate*

Following the procedure of Example 13 but substituting 6α,17α-dihydroxy-6α-methyl-1,4-pregnadiene-3,20-dione 17-acetate (VIII) or 6α,17α-dihydroxy-6β-methyl-1,4-pregnadiene-3,20-dione 17-acetate (VII) as the starting material in place of 6β,17α-dihydroxy-6α-methyl-4-pregnene-3,20-dione 17-acetate is productive of 6-methyl-17α-hydroxy-1,4,6-pregnatriene-3,20-dione 17-acetate.

Similarly substituting as the starting steroid in Example 14 other 17-acylates of 6β,17α-dihydroxy-6α-methyl-1,4-pregnadiene-3,20-dione (VIII) or 6α,17α-dihydroxy-6β-methyl-1,4-pregnadiene-3,20-dione (VII) wherein the acyl radical is that of a hydrocarbon carboxylic acid, e.g., those acids listed in Preparation 2, above, is productive of the corresponding 6-methyl-17α-hydroxy-1,4,6-pregnatriene-3,20-dione 17-acylate.

We claim:
1. 6α,17α - dihydroxy - 6β - methyl - 4 - pregnene-3,20-dione 17-acetate.
2. 6α,17α - dihydroxy - 6β - methyl - 1,4 - pregnadiene-3,20-dione 17-acylate in which the acyl radical is that of a hydrocarbon carboxylic acid containing from 1 to 12 carbon atoms, inclusive.
3. 6α,17α - dihydroxy - 6β - methyl - 1,4 - pregnadiene-3,20-dione 17-acetate.
4. 6α,17α - dihydroxy - 6β - methyl - 1,4 - pregnadiene-3,20-dione.
5. 6β,17α - dihydroxy - 6α - methyl - 1,4 - pregnadiene-3,20-dione 17-acylate in which the acyl radical is that of a hydrocarbon carboxylic acid containing from 1 to 12 carbon atoms, inclusive.
6. 6β,17α - dihydroxy - 6α - methyl - 1,4 - pregnadiene-3,20-dione 17-acetate.
7. 6β,17α - dihydroxy - 6α - methyl - 1,4 - pregnadiene-3,20-dione.
8. The process for the production of 6α,17α-dihydroxy-6β-methyl-4-pregnene-3,20-dione 17-acylate which comprises treating 3β,17α-dihydroxy-5α,6α-epoxy-6β-methyl-pregnan-20-one 17-acylate under Oppenauer oxidation conditions with a ketone and an aluminum alkoxide to produce the corresponding 6α,17α-dihydroxy-6β-methyl-4-pregnene-3,20-dione 17-acylate.
9. The process for the production of 6α,17α-dihydroxy-6β-methyl-4-pregnene-3,20-dione 17-acetate which comprises treating 3β,17α-dihydroxy-5α,6α-epoxy-6β-methyl-pregnan-20-one 17-acetate under Oppenauer oxidation conditions with a cyclohexanone and aluminum isopropoxide to produce a 6α,17α-dihydroxy-6β-methyl-4-pregnene-3,20-dione 17-acetate.
10. The process for the production of 6β,17α-dihydroxy-6α-methyl-4-pregnene-3,20-dione 17-acylate which comprises: dehydrating 5α,6β,17α-trihydroxy-6α-methyl-pregnane-3,20-dione 17-acylate with a dehydrating agent to produce the corresponding 6β,17α-dihydroxy-6α-methyl-4-pregnene-3,20-dione 17-acylate.
11. The process for the production of 6β,17α-dihydroxy-6α-methyl-4-pregnene-3,20-dione 17-acetate which comprises: dehydrating 5α,6β,17α-trihydroxy-6α-methyl-pregnane-3,20-dione 17-acetate with pyrrolidine to produce 6β,17α-dihydroxy-6α-methyl-4-pregnene-3,20-dione 17-acylate.
12. The process for the production of a compound of the formula:

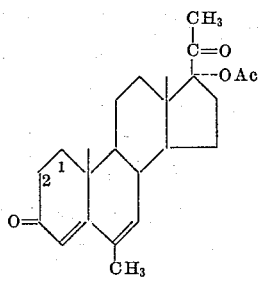

wherein Ac is the acyl radical of a hydrocarbon carboxylic acid containing from 1 to 12 carbon atoms, inclusive, and the 1,2-carbon atom linkage is selected from the linkages consisting of single bond and double bond linkages, which comprises: dehydrating a compound selected from the group consisting of:

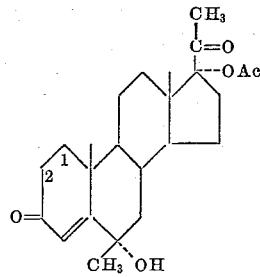

and

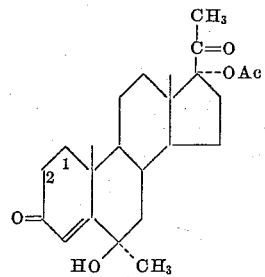

wherein Ac and the 1,2-carbon atom linkage have the same meanings as given above, with thionyl chloride in the presence of pyridine to produce the corresponding 6-dehydro-17-acylate.
13. The process for the production of 6-methyl-17α-hydroxy-4,6-pregnadiene-3,20-dione 17-acetate which comprises: dehydrating 6β,17α-dihydroxy-6α-methyl-4-pregnene-3,20-dione 17-acetate with thionyl chloride in the presence of pyridine to produce 6-methyl-17α-hydroxy-4,6-pregnadiene-3,20-dione 17-acetate.
14. The process for the production of 6-methyl-17α-hydroxy-4,6-pregnadiene-3,20-dione 17-acetate which comprises: dehydrating 6α,17α-dihydroxy-6β-methyl-4-pregnene-3,20-dione 17-acetate with thionyl chloride in the presence of pyridine to produce 6-methyl-17α-hydroxy-4,6-pregnadiene-3,20-dione 17-acetate.
15. The process for the production of 6-methyl-17α-hydroxy-1,4,6-pregnatriene-3,20-dione 17-acetate which comprises: dehydrating 6β,17α-dihydroxy-6α-methyl-1,4-pregnadiene-3,20-dione 17-acetate with thionyl chloride in the presence of pyridine to produce 6-methyl-17α-hydroxy-1,4,6-pregnatriene-3,20-dione 17-acetate.
16. The process for the production of 6-methyl-17α-hydroxy-1,4,6-pregnatriene-3,20-dione 17-acetate which comprises: dehydrating 6α,17α-dihydroxy-6β-methyl-1,4-pregnadiene-3,20-dione 17-acetate with thionyl chloride in the presence of pyridine to produce 6-methyl-17α-hydroxy-1,4,6-pregnatriene-3,20-dione 17-acetate.
17. A compound selected from the group consisting of 17α-acetoxy-6-hydroxy 6-methyl-Δ⁴-pregnene-3,20-dione and the Δ¹-derivative thereof.
18. The compound 6β-methyl-6α,17α-dihydroxy-Δ⁴-pregnene-3,20-dione.

References Cited in the file of this patent
UNITED STATES PATENTS

| | | |
|---|---|---|
| 2,936,312 | Babcock et al. | May 10, 1960 |
| 3,002,969 | Petrow et al. | Oct. 3, 1961 |
| 3,004,966 | Petrow et al. | Oct. 17, 1961 |

OTHER REFERENCES
Dominguez, C.A. 52, 19645(e) 1958.
Acta Chimic Sinica 25, 427–428 (1959) C.L.
Ellis et al., J.C.S. (London) 1960, pages 2828–33.